Dec. 15, 1959 S. L. CLAY 2,916,829
MEASURING INSTRUMENT
Filed Feb. 18, 1959
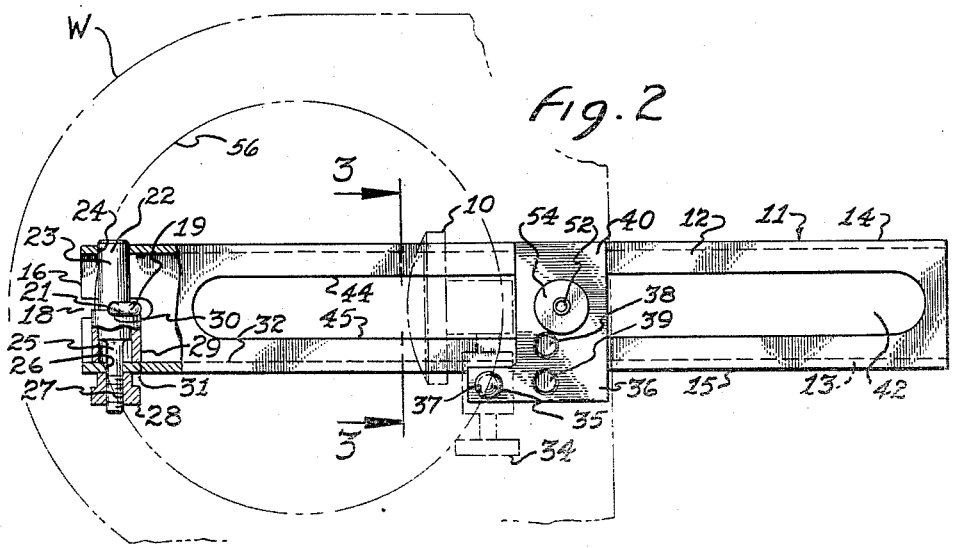
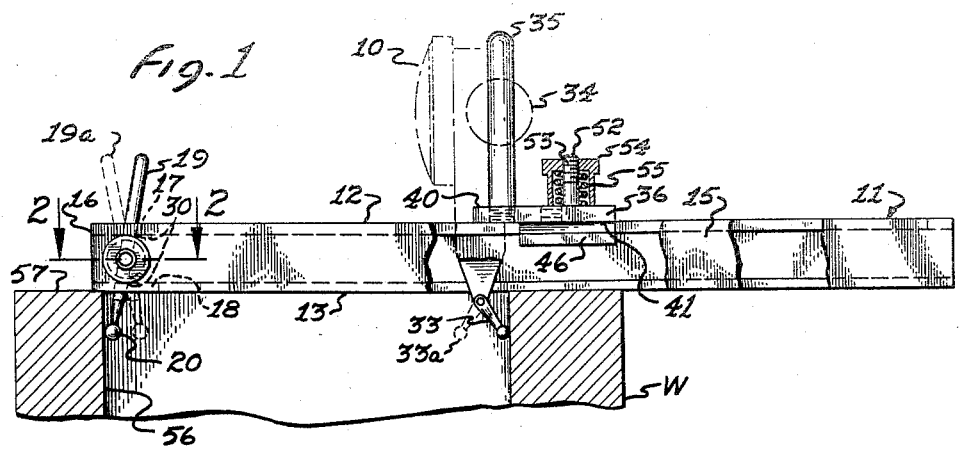
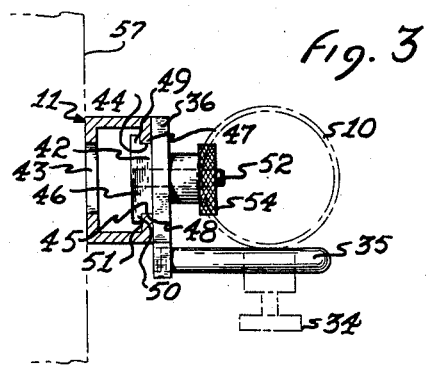
INVENTOR.
SAM L. CLAY
BY
ATTORNEY

United States Patent Office 2,916,829
Patented Dec. 15, 1959

2,916,829

MEASURING INSTRUMENT

Sam L. Clay, Phoenix, Ariz.

Application February 18, 1959, Serial No. 794,056

1 Claim. (Cl. 33—147)

This invention pertains to improvements in measuring instruments and is particularly directed to an adaptor to convert a standard test indicator into a comparator for measuring inside and outside diameters and lengths.

One of the objects of this invention is to provide an adaptor for a standard test indicator to render the indicator universally applicable to measuring outside diameters, bores and lengths of work pieces.

Another object of this invention is to provide an adaptor for a standard test indicator which measures outside diameters and bores while engaging the face of the work piece to provide a standard reference surface for precise repetitive measurements.

Further features and advantages of this invention will appear from a detailed description of the drawings in which:

Fig. 1 is a side elevation of a measuring instrument incorporating the features of this invention.

Fig. 2 is a plan view, partly in section on the line 2—2 of Fig. 1.

Fig. 3 is an enlarged transverse section on the line 3—3 of Fig. 2.

As an example of one embodiment of this invention there is shown a measuring instrument adapted to mount a dial test indicator 10 comprising a main beam 11 comprising a rectangular tubular member having the outside face 12, the inside or work contacting face 13 and the sides 14 and 15.

The anvil end 16 has formed therein slots 17 and 18 in the outside face 12 and inside face 13 to provide space for the anvil finger 19 having the work contacting ball 20 formed on one end thereof. The anvil finger is carried in the diametral cross bore 21 formed in the clamping pin 22 having an enlarged diameter portion 23 supported in the bore 24 in the side 14 of the main beam 11. The other end of the clamping pin 22 has a reduced portion 25 which is journaled in a bore 26 formed in the side 15 of the main beam 11. The outer end of the reduced portion 25 is provided with threads 27 upon which is mounted the clamping nut 28. A clamping sleeve 29 is positioned on the enlarged diameter portion 23 of the clamping pin 22 and has arcuate notches 30 engaging the sides of the anvil finger 19 while the rear face 31 of the clamping sleeve 29 abuts against the inside face 32 of the side 15 so that by tightening the clamping nut 28 the anvil finger can be locked to the main beam 11 in various positions, as shown, for example, in Fig. 1.

The dial test indicator 10 of standard design having the usual work engaging stylus 33 and clamping bolt 34 which grips the mounting post 35 which is fixed to the base plate 36 in one of the threaded bores 37, 38 or 39 in the top surface 40 of the base plate 36. The bottom surface 41 of the base plate 36 is slidable on the outside face 12. Elongated slots 42 and 43 having guide edges 44 and 45 are formed in the outside and inside faces 12 and 13 of the main beam 11. A clamp block 46 has guide surfaces 47 and 48 slidingly engaging the guide edges 44 and 45 of slot 42 while clamping lips 49 and 50 engage and grip the inside surface 51 of the outside face 12. A clamping stud 52 is fixed in the clamp block 46 and extends outwardly above the top surface 40 of the base plate 36 and has a threaded outer end 53 upon which is mounted the thumb nut 54, a suitable compression spring 55 inside the thumb nut 54 serving to maintain frictional sliding between the base plate 36 and main beam 11 when thumb nut 54 is loosened to facilitate setting the dial indicator 10 in proper engagement with the work piece W.

In the use of the measuring instrument, when the bore 56 of the work piece W is to be measured, the anvil finger 19 is locked to the beam 11 in the full line position shown in Fig. 1, the beam surface 13 is placed against the face 57 of the work piece, and the base plate 36 and dial indicator 10 adjusted longitudinally of the beam 11 and then clamped by tightening thumb nut 54 with the dial indicator stylus 33 engaging the diametrically opposite wall of the bore 56. For measuring external diameters the anvil finger 19 is positioned as shown at 19a, Fig. 1, and the stylus positioned as shown at 33a, the beam again being held against the face 57 of the work piece W.

While the apparatus herein disclosed and described constitutes a preferred form of the invention, it is also to be understood that the apparatus is capable of mechanical alternation without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A measuring instrument including, a main beam having a locating surface adapted to engage the face of a work piece to be measured, an anvil finger pivotally mounted to be clamped in adjusted positions on one end of said beam, a work contact ball on the end of said anvil finger adapted to engage the wall of an inside bore and the outside diameter portion of said workpiece, a base plate adjustable longitudinally of said beam, means on said base plate to hold a standard dial indicator thereon with the stylus of said dial indicator engaging the work surface to be measured at a point diametrically opposite to the point of engagement of said anvil finger with the work piece surface to be measured, said beam comprising a rectangular hollow tube having longitudinally extending slots therein, and said base plate including means for supporting said dial indicator with its stylus projecting through the slots in said beam to engage the work surface to be measured.

References Cited in the file of this patent

UNITED STATES PATENTS

| | | |
|---|---|---|
| 1,034,795 | Helwig | Aug. 6, 1912 |
| 2,274,275 | Phillips | Feb. 24, 1942 |
| 2,648,134 | Billeter | Aug. 11, 1953 |